United States Patent [19]

Efird

[11] Patent Number: 4,820,110

[45] Date of Patent: Apr. 11, 1989

[54] CONTAINER TRANSPORT SYSTEM

[76] Inventor: Alex M. Efird, 1925 Brookhaven Rd., Wilmington, N.C. 28403

[21] Appl. No.: 161,767

[22] Filed: Feb. 29, 1988

[51] Int. Cl.[4] ............................................. B60P 3/00
[52] U.S. Cl. .................................... 414/458; 180/19.2
[58] Field of Search ............ 414/458, 459, 460, 786; 180/19.2

[56] References Cited

U.S. PATENT DOCUMENTS

| | | | |
|---|---|---|---|
| 2,463,381 | 3/1949 | Hicks | 414/458 X |
| 2,816,675 | 12/1957 | Baker | 414/458 |
| 3,166,139 | 1/1965 | Ulinski | 180/19.2 X |
| 3,193,301 | 7/1965 | Talbert et al. | 414/458 X |
| 3,414,087 | 12/1968 | Schmiesing | 414/458 X |
| 3,520,430 | 7/1970 | Dunbar | 414/458 |
| 3,612,484 | 10/1971 | Gallagher et al. | 414/458 X |
| 4,168,931 | 9/1979 | Harris | 414/458 |

FOREIGN PATENT DOCUMENTS

| | | | |
|---|---|---|---|
| 2205495 | 8/1973 | Fed. Rep. of Germany | 414/458 |
| 229835 | 11/1985 | Japan | 414/460 |
| 1220961 | 3/1986 | U.S.S.R. | 414/458 |
| 1282575 | 7/1972 | United Kingdom | 180/19.2 |

Primary Examiner—David A. Bucci
Attorney, Agent, or Firm—Rhodes, Coats & Bennett

[57] ABSTRACT

The present invention entails a container transport system for transporting a container, such as a moving and storage container between a truck and a residence. Forming a part of the system is a powered mobile carrier that includes a front power module and a separate rear wheel container support module. A powered cable assembly is carried by the front module and the cable assembly is operative to link the front and rear modules together in such a fashion that a container is supported therebetween by opposed forks extending from the respective modules along with segments from the cable assembly extending underneath the container.

13 Claims, 9 Drawing Sheets

CONTAINER TRANSPORT SYSTEM

FIELD OF THE INVENTION

The present invention relates to a handling systems for handling and transporting household moving and storage containers. More particularly, the present invention relates to a portable, motorized container carrier that is steerable and fully controlled by a single individual that typically walks along with the carrier during the transporting process.

BACKGROUND OF THE INVENTION

Today, the moving and storage industry is vast as there is a great deal of mobility among people and businesses.

Typically in moving, articles, packages, and even furniture are first packed into large wooden containers that are stationed in a moving trailer. Articles are generally hand carried from the residence to the truck which depending on certain situations and circumstances can be a significant distance. Moreover, once reaching the truck, those individuals carrying the articles must lift and carry them up a ramp into the truck. Obviously, this is a very laborious, time-consuming, and exhausting chore, not to mention the expense associated with such.

After the household articles are all packed, the moving trailer is directed to a new residence or in some cases the articles and furniture are sent to a warehouse for temporary storage. In the case where the articles are shipped to a new residence, the very same articles have to be unpacked from the container while in the trailer, and hand carried from the trailer into the new residence. Thus, the same laborious, time-consuming, and exhausting chore is repeated.

Presently, the moving and storage industry does not have a fully automatic and integrated system for handling containers from door to door. In a commonly owned U.S. patent application, Ser. No. 128,870, filed Dec. 4, 1987, and entitled COLLAPSIBLE MOVING AND STORAGE CONTAINER, there is disclosed a highly efficient, knock down container that starts to address the needs of a fully automatic and integrated, moving system. In this application, the present inventor discloses a lightweight container that can be easily broken down for storage and which is designed to form a part of a fully automatic, moving system. In such a system, it is envisioned that these containers can be transported directly to the front door of a residence, loaded there, and transported back to the moving trailer where the containers can be automatically loaded into the trailer. Thereafter, that same process can be utilized for transporting the filled container from the trailer to the front door of a new residence.

Today, there has not really been an attempt at designing a container carrier for filling the gap between the trailer and the residence. This, obviously, is no easy undertaking inasmuch as the containers are relatively large and heavy. Any such carrier must be designed to be portable, at least to the extent that will enable the carrier to be hauled from location to location in the moving trailer.

SUMMARY AND OBJECTS OF THE INVENTION

The present invention deals with a portable carrier for transporting storage and moving containers between the moving trailer and the residence. This eliminates the great labor requirement of hand carrying the furniture and other household or business articles from the building site where they are housed to the truck and vice versa.

Broadly the present invention entails a portable, motorized carrier that is comprised of two separate modules: a front wheel supported and powered module and a rear wheel container support module. A cable assembly is carried by the front power module and interconnects with the rear wheel module to support a container therebetween. Specifically, the cable assembly extends from the front module to the rear wheel module and underneath a container disposed therebetween. By drawing the cable assembly towards the front module, the rear wheel container support assembly is pulled underneath the container. At the same time, the rear wheel container support assembly pulls the front module underneath the container in such a fashion that the front and rear modules move toward each other. Both modules cooperate to lift the container and support the container between the front and rear modules. Thereafter, an operator can actuate the front power module and through a steering arm can direct the same between the moving trailer and the residence.

It is therefore an object of the present invention to provide a highly effective and efficient transport device for transporting containers between a moving van and a residence.

Another object of the present invention resides in the provision of a container carrier that is relatively small, lightweight, and sufficiently portable to enable the carrier to be hauled from location to location in the moving trailer.

Still a further object of the present invention resides in the provision of a portable container carrier that is capable of carrying and supporting relatively large container loads, but whose size is minimized in order to facilitate the actual transporting of the container carrier in a moving trailer.

It is also an object of the present invention to provide a container carrier of the character referred to above that is self propelled.

Another object of the present invention resides in the provision of a portable self-propelled container carrier that comprises front and rear separable modules.

It is also an object of the present invention to provide a self-propelled, portable container carrier of the character referred to above that incorporates a cable assembly for interconnecting the front and rear modules wherein the cable assembly actually acts to support, in part at least, a container between the front and rear modules.

Still a further object of the present invention resides in the provision of a portable, self-propelled container carrier of the character referred to above that is adjustable to carry various size containers.

Another object of the present invention resides in the provision of a lightweight, portable, motorized container carrier that is designed to traverse substantially all types of terrain and pavements typically found in and around a residence.

A further object of the present invention resides in the provision of a portable container carrier of the type described above that is provided with walk along controls that enables the carrier to be fully controlled by an individual walking along the side of the carrier as it moves from location to location.

Still a further object of the present invention resides in the provision of a portable container carrier that is provided with a power plant that is fully capable of giving continuous 24 hour service after which the same can be fully recharged.

It is also an object of the present invention to provide a portable container carrier that is compatible with the environment and landscape around a residence inasmuch as the portable container carrier is designed with balloon type tires that enable the container carrier to traverse a lawn without damaging the same and also allows it to traverse driveways and pavements without cracking the same.

It is also an object of the present invention to provide a portable, lightweight, motorized container carrier that is of a low profile design and that will enable the carrier to transport containers under ceiling and conventional overhead structures.

Still a further object of the present invention resides in the provision of a container carrier that is highly maneuverable and which has the capability of reaching freight elevators in various condominuims and apartment structures.

It is also an object of the present invention to provide a container carrier of the type referred to above that is stable, strong, sturdy, and highly reliable.

It is also an object of the present invention to provide a portable, motorized container carrier of the character referred to above that is of a compact design inasmuch as the working components of the carrier are confined and spaced around a relatively small area.

It is also an object of the present invention to provide a portable, motorized container carrier that is designed to automatically engage, lift, and elevate the container to a loaded position for transport, thereby making the carrier self-loading and obviating the requirement that the container be loaded by hand or by other means.

Another object of the present invention resides in the provision of a container carrier that has the capability of automatically releasing and unloading the container from the carrier.

It is also an object of the present invention to provide a portable, motorized container carrier of the front and rear separable module type that is designed to receive and support the container between the respective modules in such a fashion that the base of the container actually forms the chassis of the carrier, thereby enabling the carrier to be more efficiently designed from a weight consideration.

It is also an object of the present invention to provide a container carrier that has secondary utility, that is utility apart from that of transporting containers.

A further object of the present invention resides in the provision of a dual module container carrier wherein the modules are separable wherein the modules can be connected in a short configuration mode to yield the secondary utility referred to above.

Other objects and advantages of the present invention will become apparent and obvious from a study of the following description and the accompanying drawings which are merely illustrative of such invention.

CONTAINER TRANSPORT SYSTEM

Figure 1:
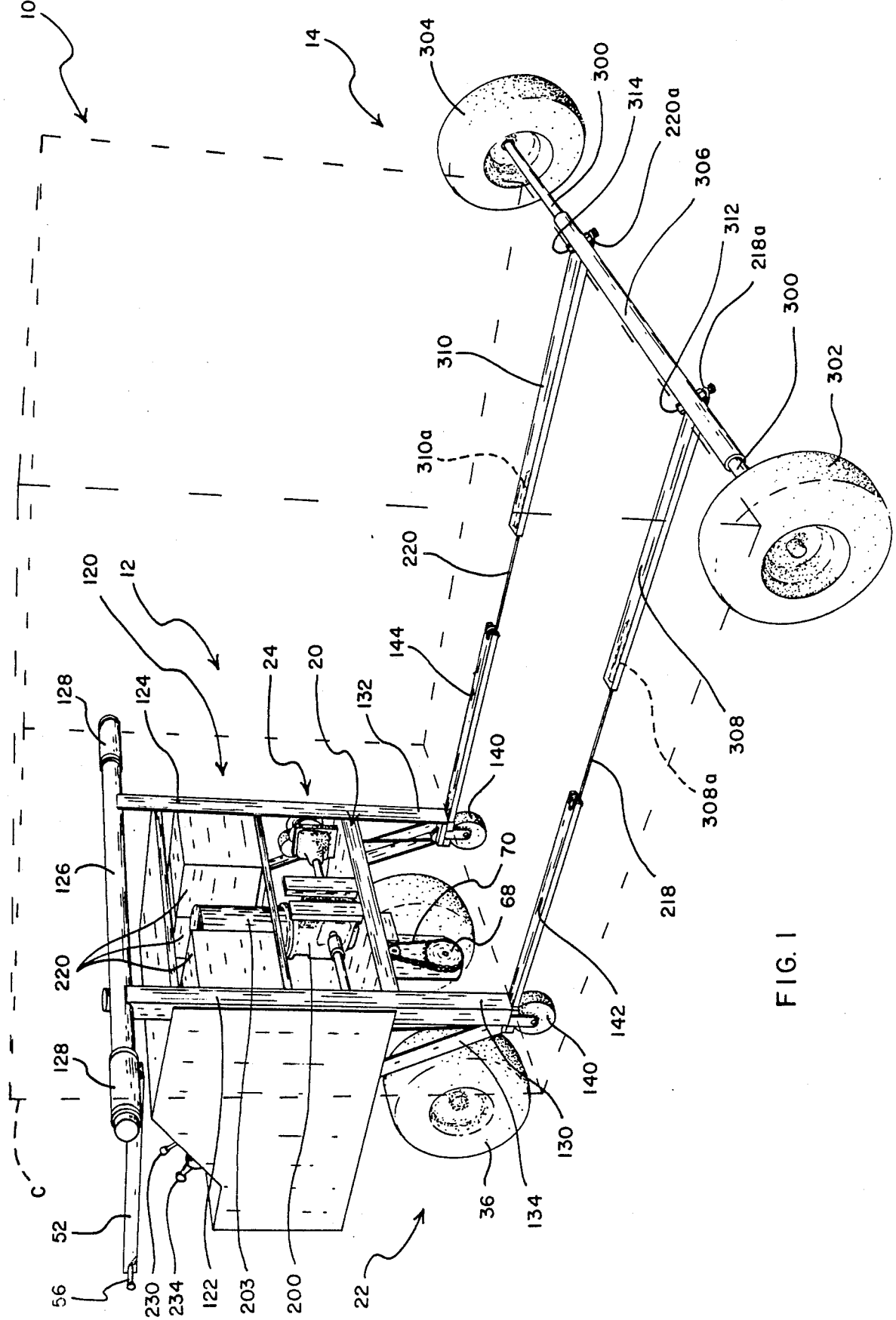
FIG. 1 is a perspective view of the container transport system of the present invention supporting a container.

With further reference to the drawings, the container transport system of the present invention is shown therein and indicated generally by the numeral 10. Container transport system 10 includes front and rear separable modules indicated generally by the numerals 12 and 14 respectively.

Briefly, front module 12 is a steerable, battery powered unit that is designed to engage and support one end portion of a container C. Rear module 14 is referred to as a rear wheel container support assembly and is linked with the front module 12 through a cable assembly to be described subsequently in detail. As will be appreciated from subsequent portions of this disclosure, the container transport system 10 is designed to support container C between front and rear modules 12 and 14, and while the container C is actually engaged and supported in part by the respective modules, the transport system 10 utilizes a cable assembly that also engages and supports in part at least container C.

Turning to the front power module 12, the same comprises a number of subassemblies. In that regard, the power module 12 includes a driven and steerable wheel assembly indicated generally by the numeral 22 which supports a main frame assembly 20 thereover. Main frame assembly 20 includes a cable and cable drive assembly 24. As will be more fully understood after reviewing and studying subsequent portions of this disclosure, the powered wheel assembly 22 is designed to be rotated relative to the main frame assembly 20. Consequently, main frame assembly 20 may lie relatively stationary with respect to container C during the transport process while the driven wheel assembly 22 can be rotated to effectuate steering.

Figure 2:
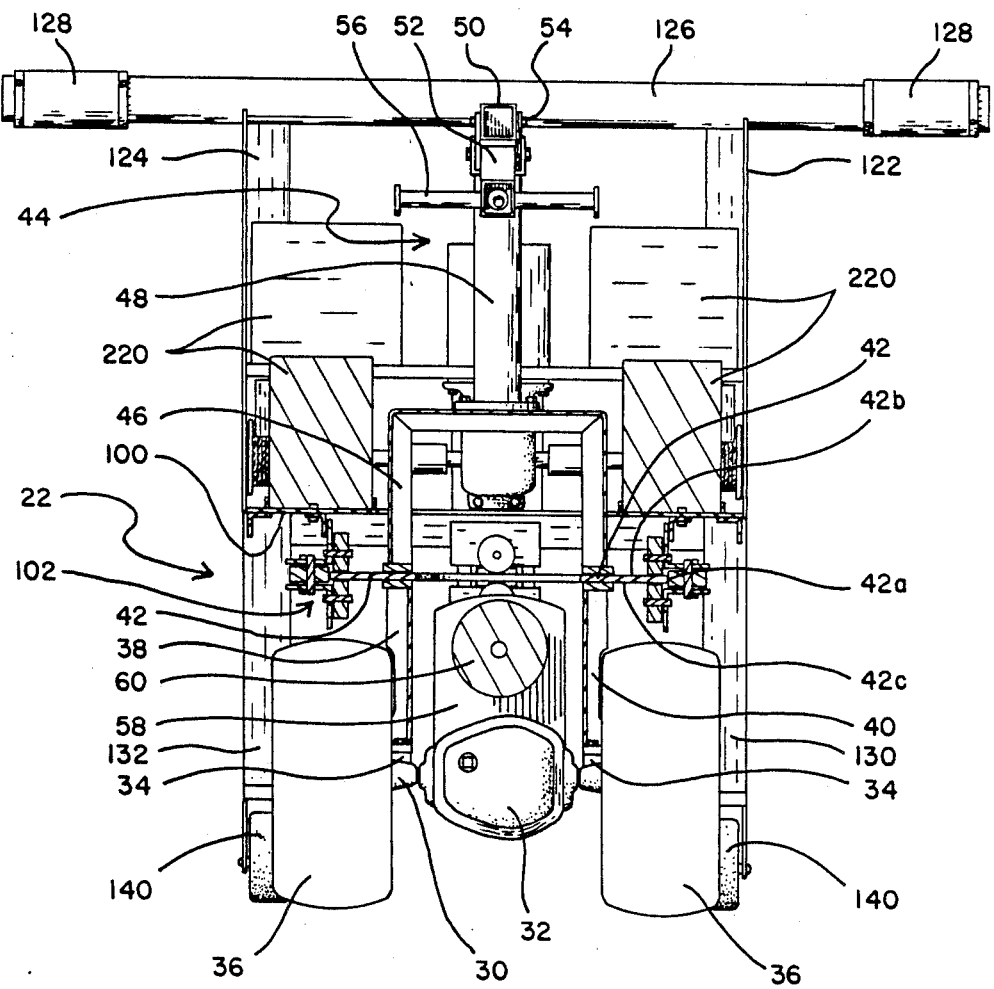
FIG. 2 is a vertical sectional view of the front module taken along the lines 2—2 of FIG. 6.
Figure 3:
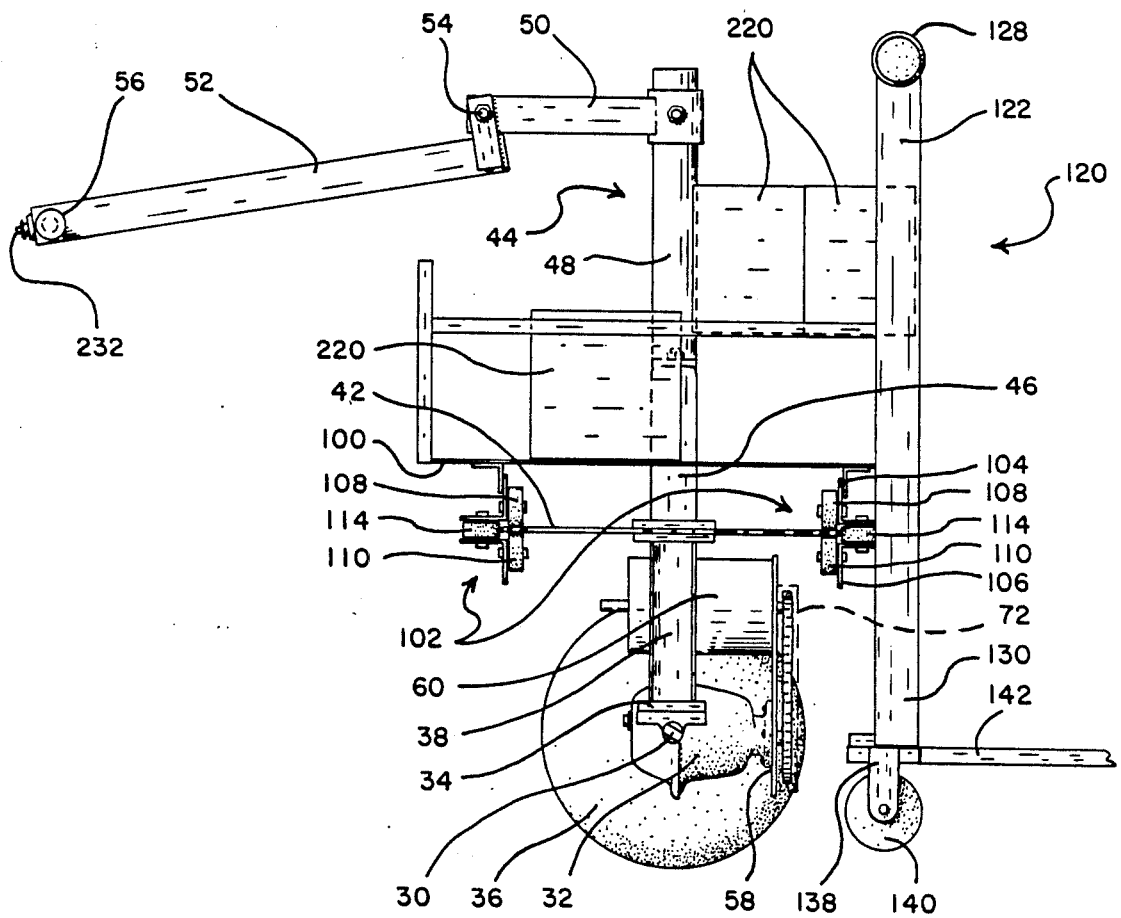
FIG. 3 is a fragmentary side view of the front module with a portion of the sheet metal frame structure not shown in order to better illustrate the internal structure of the front module.
Figure 4:
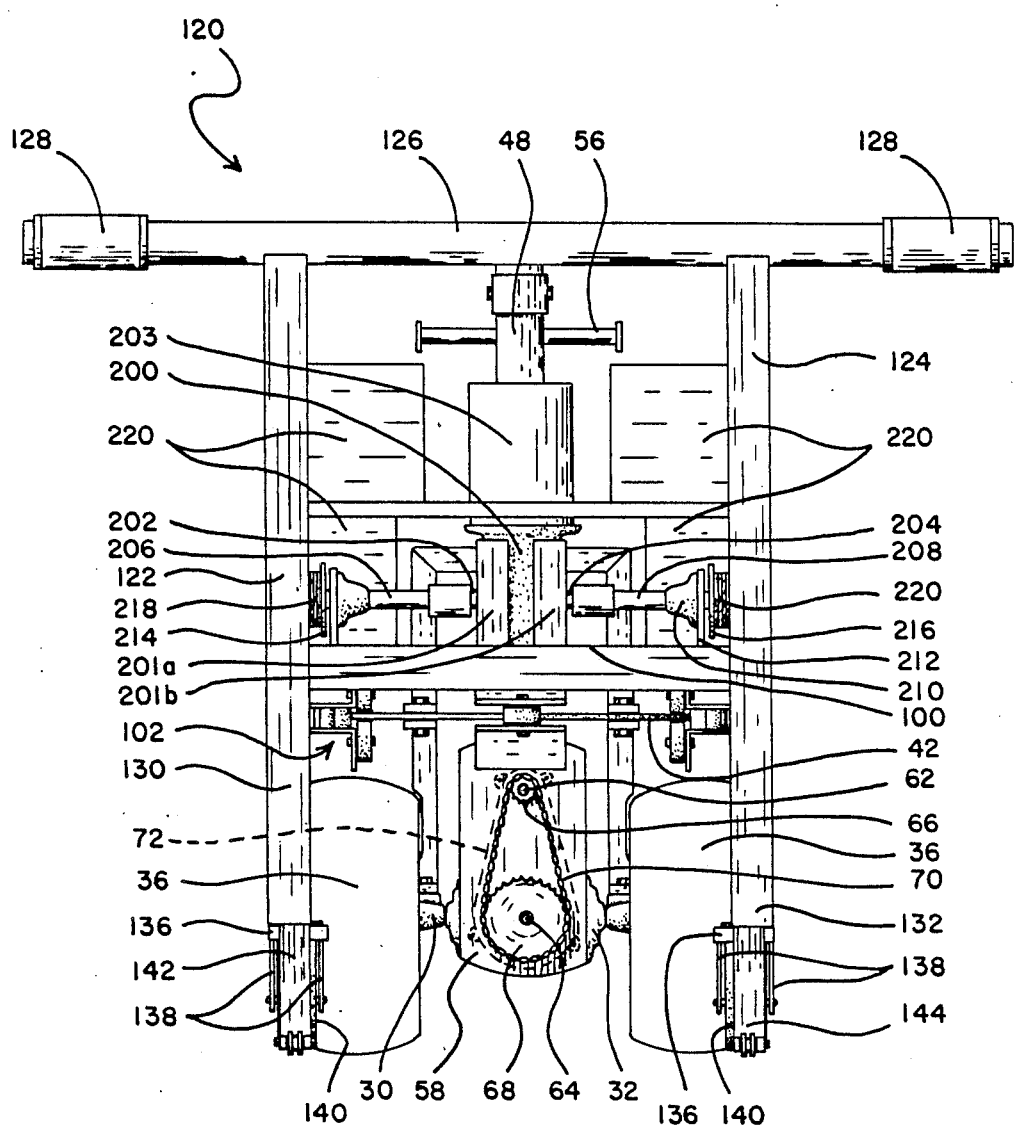
FIG. 4 is a rear elevational view of the front module.

First, the power wheel assembly 22 (FIG. 2) will be described. Powered wheel assembly 22 includes an axle-housing assembly 30 that extends outwardly from both sides of a differential gear drive 32. Rotatively mounted to opposite ends of axle-housing assembly 30 is a pair of balloon wheels 36. It should be emphasized that the present design of the powered wheel assembly 22 emphasizes the use of dual front wheels 36 but also stresses a design that maintains the wheels relatively close together. Secured to the axle-housing assembly 30 on both sides of differential gear drive 32 is a pair of mounting blocks 34. Secured to the mounting blocks 34 is a pair of vertical wheel arms 38 and 40. Wheel arms 38 and 40 include upper terminal ends that connect by weldment or other suitable means to an annular or circular turning plate 42. Circular turning plate 42 comprises a circular plate having a central opening and an outer circumferential edge 42a, a top surface 42b, and a lower surface 42c.

Secured to turning plate 42 and extending upwardly therefrom is a hand operated turning or steering assembly indicated generally by the numeral 44. Steering assembly 44 comprises a yoke structure 46 secured to the top 42b of turning plate 42. Yoke 46 extends upwardly from turning plate 42 and has connected to its upper portion a main vertical turning post 48. Connected to vertical turning post 48 at approximately a right angle thereto is outwardly extending radius arm 50. Radius arm 50 includes a terminal outer end that is connected to an outermost turning arm 52 through a pivot pin assembly 54. Transversely secured to the outer turning arm 52 is a cross handle 56.

Consequently, it is appreciated that wheels 36 can be rotated and turned through annular turning plate 42 by an individual engaging handle 56 and swinging the turning arm 52 from side to side.

To power the wheel assembly 22, there is provided an electric motor 60. The size of electric motor 60 can vary depending upon the application, but in the present design, electric motor 60 is a 2 horsepower motor rated at 2,800 rpms and capable of being powered through a 36 volt battery system. Electric motor 60 is mounted to a motor mounting plate 58 that is secured through bolts or other suitable means to a flange disposed about the rear side of differential gear drive 32. A pinion shaft 64 extends rearwardly from differential gear drive 32 through motor mounting plate 58 and includes a driven sprocket 68 mounted to its rearmost terminal end. An output shaft 62 extends from motor 60 through mounting plate 58 and includes a drive sprocket 66 secured thereto. A chain drive 70 is trained around drive sprocket 66 and driven sprocket 68 for transferring torque from motor 60 to the pinion shaft 64 of differential gear drive 32. A housing 72 is secured adjacent the rear side of mounting plate 58 for enclosing the chain drive 70 extending between motor 60 and pinion shaft 64. A 36 volt battery system 220 is operatively connected to motor 64 for powering the same.

Secured to the powered wheel assembly 22 is a main frame assembly 20. Main frame assembly 20 is rotatively mounted on the power wheel assembly 22 such that the wheel assembly can be turned while the main frame assembly 20 remains stationary.

Viewing main frame assembly 20, it is seen that the same includes a generally horizontally-disposed, open-center, rectangular frame 100. The frame 100 is rotatively mounted on circular turning plate 42 by a series of equally spaced bearing assemblies, each being indicated generally by the numeral 102. In the case of the present disclosure, there is provided four bearing assemblies 102 spaced approximately 90° apart Each bearing assembly 102 includes two vertical spaced mounting plates 104 and 106. Uppermost mounting plate 104 is bolted or otherwise secured to the rectangular frame 100 while the lower mounting plate 106 is supported and held in spaced apart relationship with the uppermost mounting plate 104 by a pair of spacers 112. Mounting plates 104 and 106 carry a series of bearings that engage circular turning plate 42 and effectively maintain main frame assembly 20 about the powered wheel assembly 22. In this regard, it is seen that each bearing assembly 102 includes an upper, roller bearing 108 secured to the uppermost mounting plate 104 and disposed for engagement with the top surface 42b in close proximity to the turning plate's outer edge 42a. Mounted directly below upper bearing 108 is a lower bearing 110 that is appropriately spaced from the upper bearing 108 so as to lie adjacent the bottom side 42c of turning plate 42. Upper and lower bearings 108 and 110 are disposed one over the other and as seen in the drawings, circular plate 42 extends therebetween.

Finally, each bearing assembly 102 includes an outer or circumferential bearing 114 that is rotatively mounted between the mounting plates 104 and 106 and just outwardly of the outer edge 42a of turning plate 42.

It is therefore appreciated that the bearing assemblies 102 cooperate to confine the main frame assembly 20 about the turning plate 42 of the powered wheel assembly 22. In addition, the bearings act to transfer the load supported by the main frame assembly 20 to the turning plate 42 which in turn transfers the load to wheels 36. It is also appreciated that the bearing assemblies 102 cooperate to maintain a proper rolling alignment around the circular plate 42 which enables circular plate 42 to be rotated relative to the bearing assemblies 102 and the main frame assembly 20 during a steering maneuver. This is because, as will be more fully appreciated from subsequent portions of this disclosure, during a steering maneuver, the main frame assembly 22 will remain generally stationary with respect to the container C while the wheels 36 are turned through the steering assembly described herein above.

Continuing to refer to the main frame assembly 20, it is seen that about the rear side thereof, there is formed a bulkhead indicated generally by the numeral 120. Forming a part of bulkhead 120 is a pair of vertical rear members 122 and 124 that are secured about the rear side of rectangular frame 100 and extend upwardly therefrom. Secured across the top portions of vertical members 122 and 124 is an upper cross member 126. Formed about each end of upper cross member 126 is a rolling collar 128 that is rotatively journaled about cross member 126. As will be more fully understood, rolling collars 128 serve to roll at various times when edge portions of the container C engages the same during travel or during the container loading or unloading operation.

Also, secured to rectangular frame 100 about the rear side is a pair of lower legs 130 and 132. Extending between rectangular frame 100 and the lower ends of legs 130 and 132 is a diagonal brace 134. Secured to the lower end of legs 130 and 132 is a plate 136 that has a pair of laterally spaced wheel arms 138 secured thereto and depending downwardly therefrom. A stabilizing wheel 140 is rotatively mounted between wheel arms 138.

As noted before, front module 12 is provided with means for actually engaging container C and supporting the container during the transport process. To accommodate this function, the main frame assembly 20 is provided with a pair of laterally spaced rearwardly projecting forks 142 and 144. As seen in the drawings, forks 142 and 144 are secured to a respective plate 136 by weldment or other suitable means and project rearwardly therefrom.

Main frame assembly 20 further includes a rear battery shelf that extends transversely across the rear of the main frame and is spaced upwardly above the rectangular, open-center frame 100. Viewing the rear battery shelf, it is seen that the same includes an open frame structure 146 that is actually supported by the rectangular frame 100. Open frame structure 146 defines two laterally spaced open battery seats 148 and 150, each of which is designed to receive and support a pair of batteries.

Figure 5:
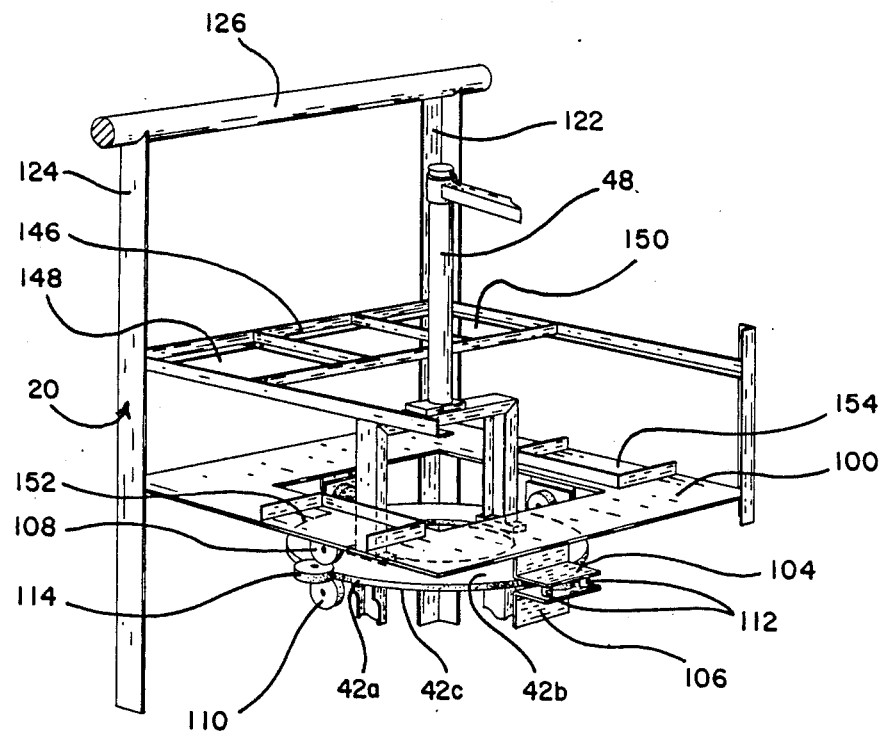
FIG. 5 is a fragmentary perspective view of the frame structure of the front module particularly illustrating the structural relationship between the turning plate of the wheel assembly and the main frame structure of the front module.
Figure 6:
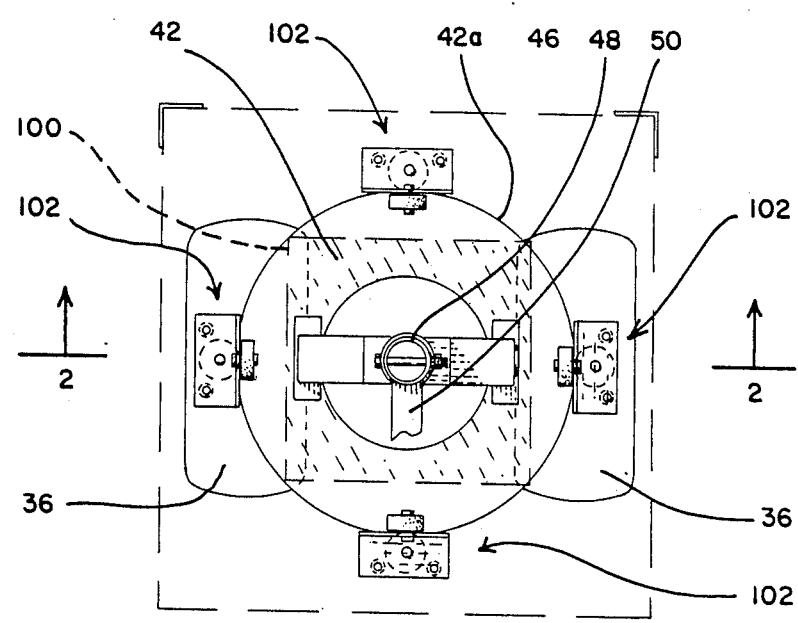
FIG. 6 is a top plan view shown in somewhat schematic form illustrating the front wheel assembly of the front module.

In addition, main frame assembly 20 includes a pair of front battery seats 152 and 154. As seen in drawings (FIG. 5), front battery seats 152 and 154 are supported directly about the front portion of rectangular open center frame 100.

Supported about the rear of main frame assembly 20 is a cable and cable drive assembly indicated generally by the numeral 24. Cable drive assembly 24 comprises a dual output gear box 200 having output shafts 202 and 204. Gear box 200 is secured to a pair of upwardly extending members 201a and 202b which are in turn secured by weldment or other suitable means to a back portion of the rectangular open-center frame 100.

Operatively connected to the input side of gear box 200 is an electric motor 203. Electric motor 203 may be of various sizes, but in the present application, it is contemplated that the same may be a ⅓ horsepower at 1,800 rpm, 24 volt electric motor. Electric motor 203 is powered by a 24 volt battery power system having batteries indicated by the numeral 220 in the drawings. Coupled to output shafts 202 and 204 is a pair of cable drive shafts 206 and 208, respectively. Each cable drive shaft 206 and 208 is rotatively journaled within a bearing assembly 210 that is supported within a bearing support block 212. Formed about the outermost end of each cable drive shaft 206 and 208 is a cable reel 214 and 216. Secured to cable reel 214 and wound therearound is a cable 218 that includes a loose remote end that includes a cable tie loop 218a. Secured to cable reel 216 and wound therearound is a second cable 220 that includes a loose remote end that includes a cable tie loop 220a.

Figure 7:
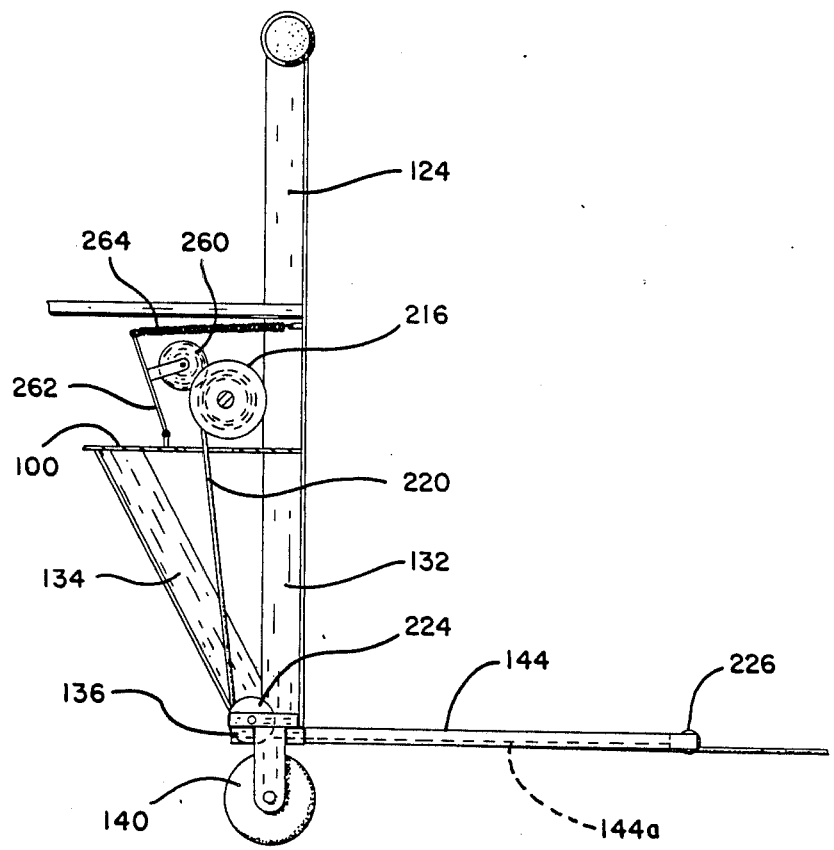
FIG. 7 is a fragmentary sectional view illustrating the cable drive assembly of the front module.

As shown in FIG. 7, there is provided an idler 260 that engages the cable wound around each reel 214 and 216. Idler 260 is secured to a pivotally mounted holding plate 262 that is spring biased toward the reels 214 and 216 by a spring 264.

An opening 222 is formed in the rectangular frame structure 100 directly below each cable reel 214 and 216. This enables each cable 218 and 220 to be directed through the respective openings 222. As seen in FIG. 7, there is a first cable idler 224 that is rotatively journaled within plate 136 that is disposed about the fore end of each front fork 142 and 144. In addition, there is a second cable idler 226 rotatively journaled within a U-shaped opening formed about the rearmost end of each front fork 142 and 144. Each front fork 142 and 144 includes an elongated cable slit 142a and 144a that is formed along the underside of each respective fork for receiving a respective strand of cable.

Now turning to the rear wheel container support assembly 14, it is seen that the same comprises a pair of outer stationary shafts 300 that have rear balloon wheels 302 and 304 rotatively mounted to opposite ends thereof. Stationary shafts 300 are interconnected by a fork carrier 306 that is fixedly secured to the stationary shafts 300 through a pair of cable pins 312 and 314 that extend entirely through both the fork carrier 306 and the adjacent stationary shaft 300. It is noted that cable pins 312 and 314 include a cable connecting projection that enables the respective cable tie loops 218a and 220a to be connected thereto. In addition, it should be pointed out that the stationary shafts 300 are axially adjustable within fork carrier 206. This enables rear wheels 202 and 204 to be adjusted inwardly and outwardly to accommodate various sized containers and more particularly, enables the balloon wheels to be adjusted to an innermost position for purposes of transport within a moving trailer. Note that each stationary shaft 300 may include one or more additional openings therein such that the cable pins 312 and 314 can be appropriately extended through such openings so as to secure the stationary shafts 200 with respect to fork carrier 206.

Projecting from fork carrier 306 is a pair of rear forks 308 and 310 that are spaced so as to align with the front forks 142 and 144. Rear forks 308 and 310 include underside cable slits 308a and 310a for receiving cable segments from the respective cables 218 and 220.

In practice, the respective front and rear forks will engage the base of a container C and will be extended through fork openings within the base of the container C. It is appreciated that roller bearing means can be mounted along the top of each respective fork to reduce friction between the respective forks and the base of container C as the forks are extended inwardly under the container during the lifting operation. For example, an L-shaped bracket can be rotatively mounted to the top of each front and rear fork such that the bracket will engage and lock with the base of the container C and will roll up the respective fork during the lifting operation.

Turning to the controls for the transport system 10 of the present invention, there is a main drive control indicated by the numeral 230. Main drive control 230 is coupled to the differential gear drive 32 and is a three position control, forward, neutral, and reverse. By selectively positioning drive gear control 230, the operator can move the carrier 10 either forwardly or rearwardly.

Formed about handle 56 is a button switch 232. Button switch 232 is the wheel motor actuator and as such, is operatively connected between drive motor 60 and batteries 220. The operator, by simply depressing button 232, can cause the carrier 10 to be powered and moved forwardly or rearwardly depending upon the position of the drive gear control 230.

Finally, there is a two position cable drive actuator 234. Cable drive actuator 234 is operatively connected between cable drive motor 203 and its batteries 222. By selectively actuating cable drive actuator 234, the respective cables 218 and 220 can be drawn onto reels 214 and 216 or can be positively unwound from the same reels.

Figure 8:
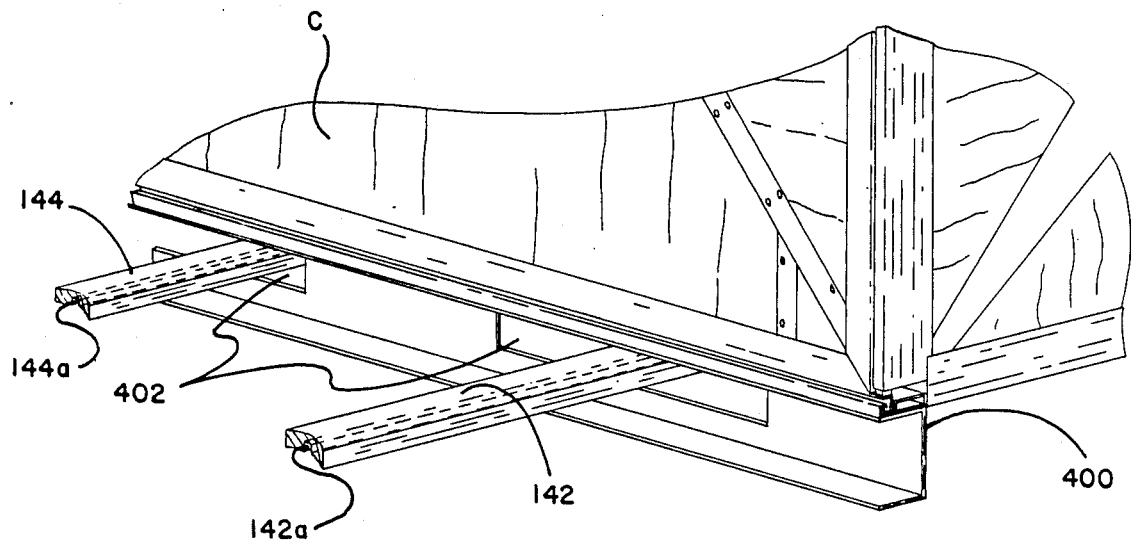
FIG. 8 is a fragmentary perspective view illustrating the insertion of a pair of forks associated with the front module into the base structure of a container.
Figure 9:
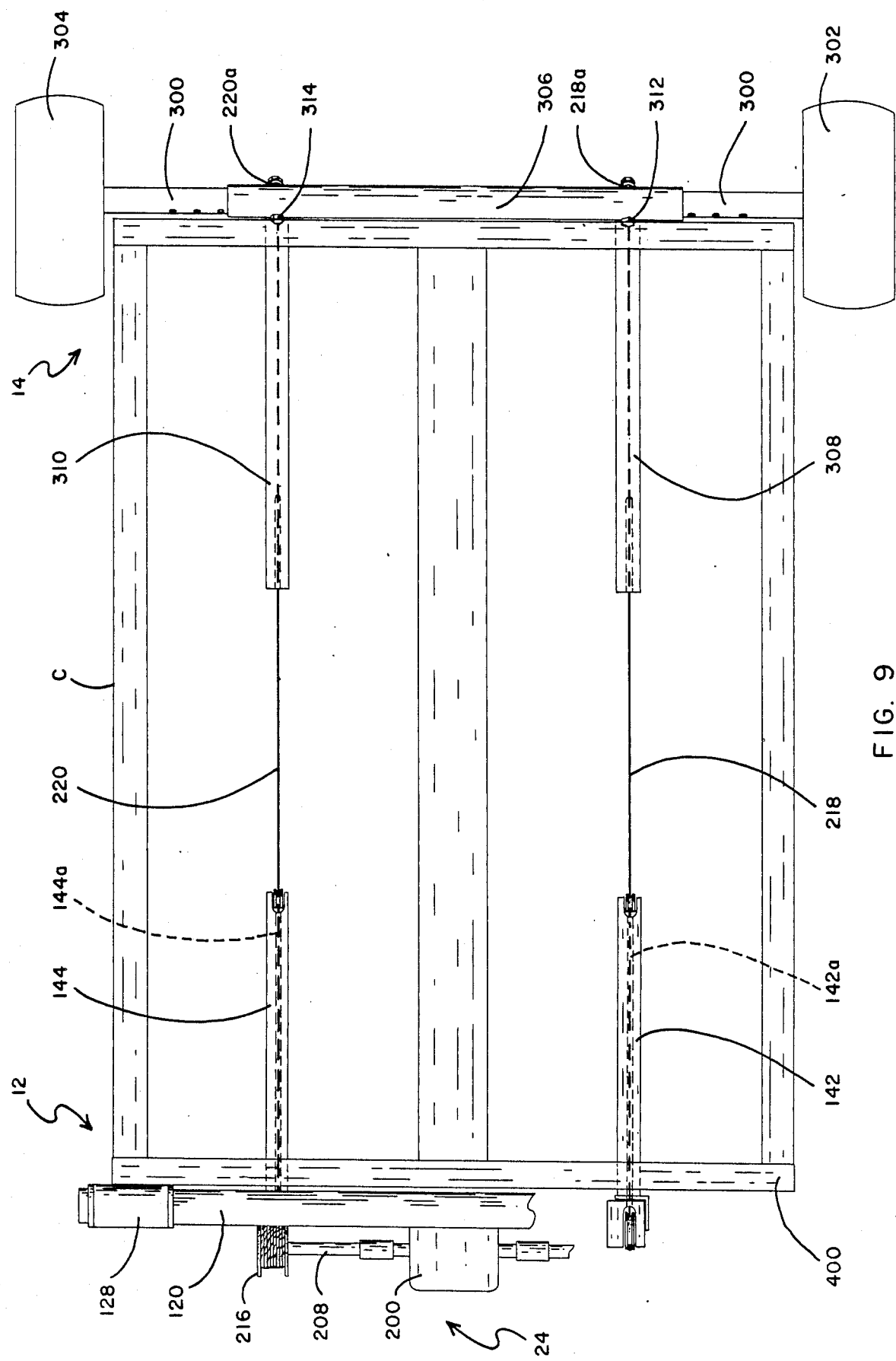
FIG. 9 is a top plan view illustrating how the base of a container is secured and supported between the front and rear modules of the container transport system of the present invention.
Figure 10A:
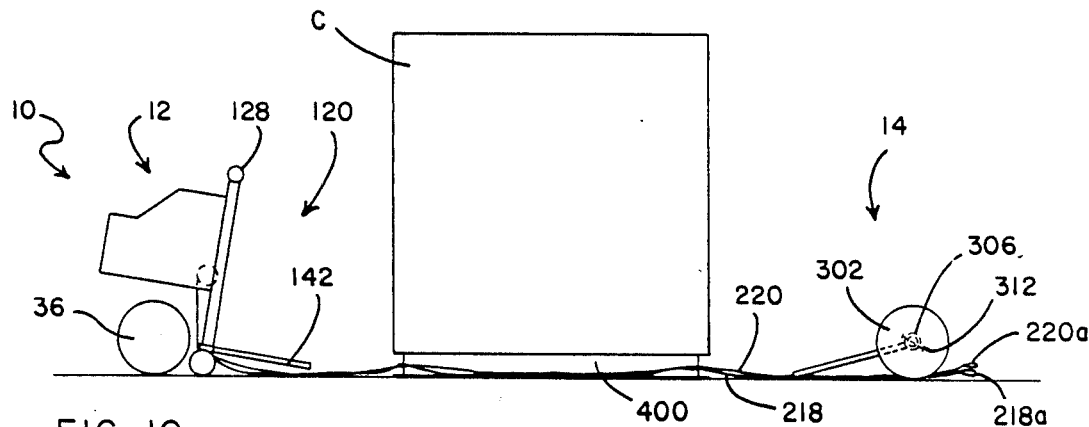
FIGS. 10a–10d are a sequence of views illustrating the lifting and loading of a container.
Figure 10B:
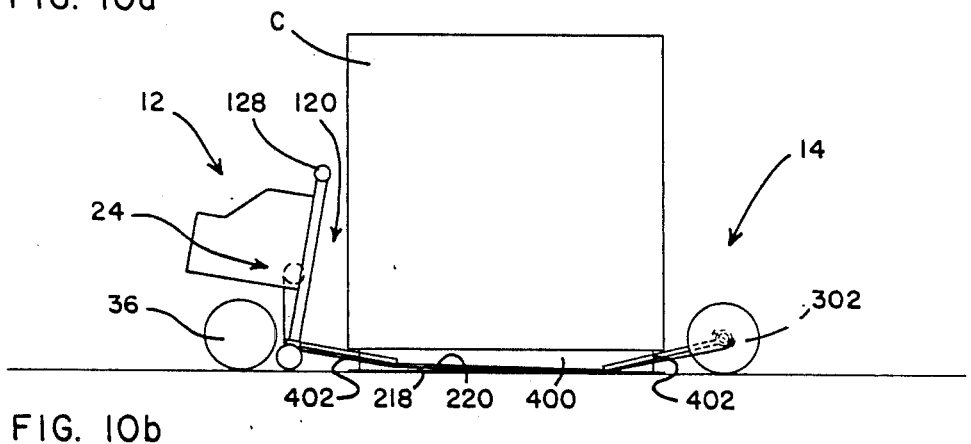
Figure 10C:
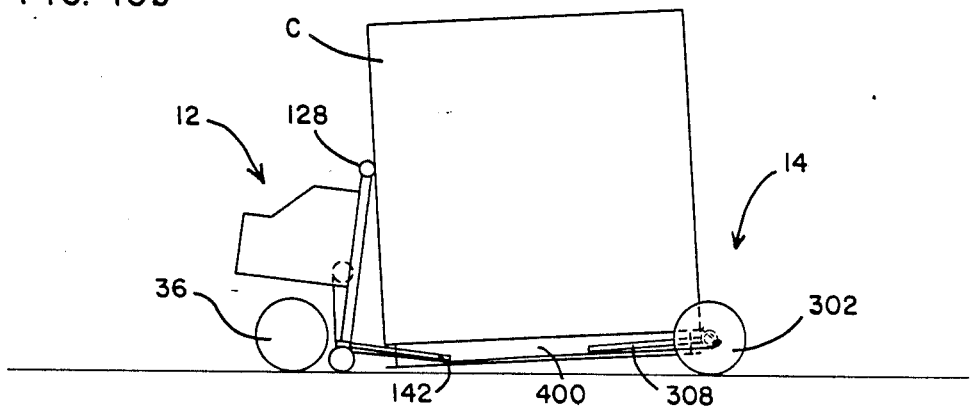
Figure 10D:
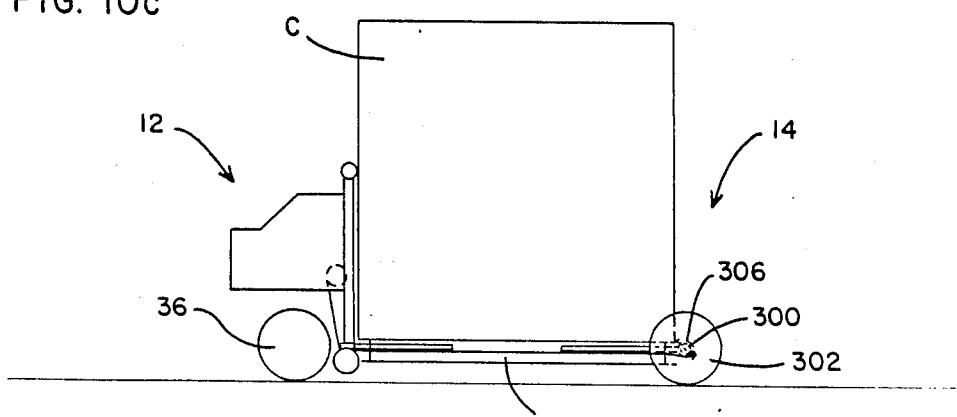
Figure 11:
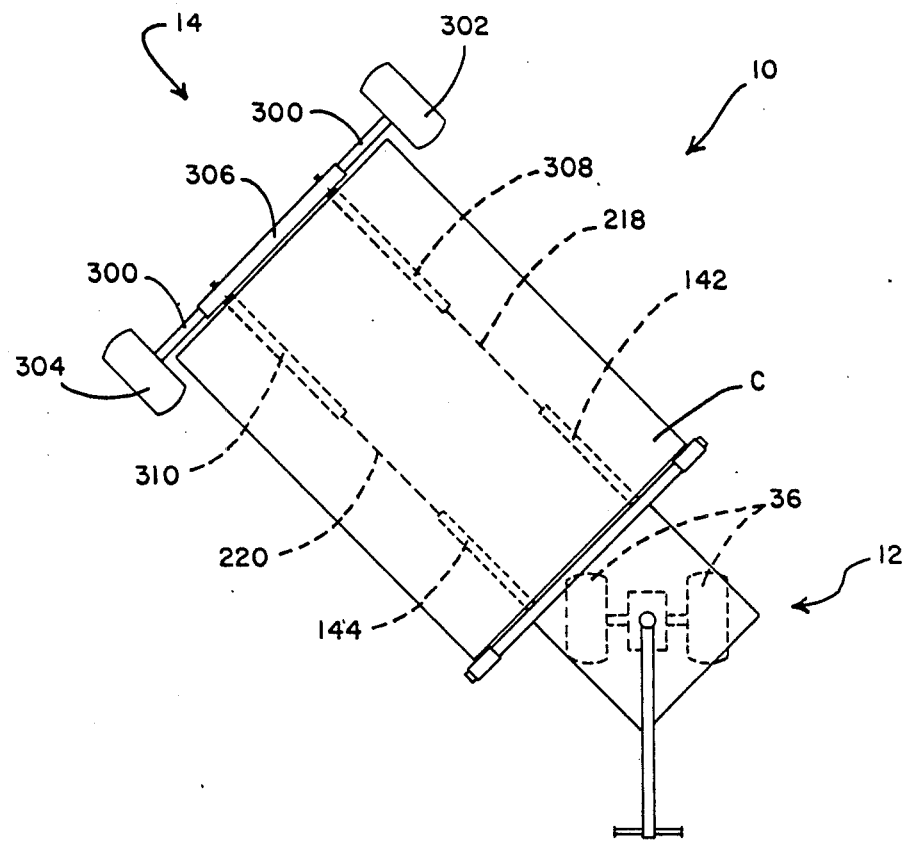
FIG. 11 is a top schematic view illustrating how the wheels of the front module can be rotated independently of a container being carried by the container transport system.

Turning to the operation of the container transport system 10 of the present invention, reference is first made to FIGS. 8 and 9 which illustrate a base 400 of a container C supported between the front and rear modules 12 and 14. Note that base 400 includes a pair of openings 402 about both ends, the openings being adapted to receive the respective front and rear forks of the transport system 10. In a supported position, one end of container base 300 is disposed adjacent bulkhead 120 and the front forks 142 and 144 project through the adjacent openings 302 of the container base 400. About the opposite end of the container base 300, it is seen that the rear forks 308 and 310 project through the openings 402 of the container base 400. This results in the container base 400 lying flush against the stationary shaft 300 and the fork carrier 306. In fact, it is this structure that actually confines the container C and the base 400 thereof such that the container C can never move rearwardly past the axis of the stationary shafts 300 and fork carrier 306.

In the support and transport mode illustrated in FIG. 9, cables 218 and 220 extend underneath the container C and underneath the respective front and rear forks. In fact, the cable tie loops 218a and 220a are connected to cable pins 312 and 314 extending through the fork carrier 306. Cable drive assembly 24 is actuated so as to maintain the cables 218 and 220 in a relatively taut position underneath the container C. In this taut position, it is appreciated that the cables effectively lift the respective front and rear forks upwardly to where they engage and support the container C thereabove. Note that the transport system is designed such that the terminal ends of the front and rear forks are disposed in spaced apart relationship when the container C is disposed in a support mode. Thus, the cable segments of cable 218 and 220 extending between the terminal ends of the respective front and rear forks actually engage or lie closely under the container C and provide at least partial support for the container C.

Base 400 of the container C actually forms a part of the chassis structure of the transport system 10 when the container C is lifted and disposed in the transport mode. Note that the distance between the front and rear modules is dictated by the width of the container C.

Now turning to FIGS. 10a-10d therein the basic operation of the transport system 10 is illustrated. In this regard, attention is first directed to loading or positioning the container C onto the transport system 10. In doing this, the front and rear module 12 and 14 are disposed adjacent opposite ends of the container C having the base 400 just described. First, the cable drive assembly 24 is actuated to positively unwind cables 218 and 220 to a sufficient degree that will allow them to be threaded through the openings 302 of base 400 of container C. In particular, the cable tie loops 218a and 220a are by any appropriate means threaded through the base 400 of the container C and particularly through opening 402 about both ends of the container C, and are secured or attached to the lower terminal ends of cable pins 312 and 314 that extend through the rear fork carrier 206.

Next, the front and rear modules are positioned or pushed adjacent respective ends of the container C. Front and rear forks of the respective module are threaded and inserted into openings 402 of the container C. At this time it is appreciated that the container C is resting adjacent the ground or other underlying surface. The cable and cable drive assembly 24 is then actuated to wind or take up the cables 218 and 220. As the cable drive assembly is actuated, it is appreciated that the front and rear modules 12 and 14 are drawn towards each other. Effectively, the rear module 14 is pulled towards the adjacent end of base 400 while the front module 12 is pulled toward the opposite end of base 300. Accordingly, the base 400 starts to ride up the forks 142, 144, 308, and 310. As the rear module 14 is drawn closer to the front module 12, the container C is lifted off the ground and is caused to ride up both the rear and front forks of the transport system 10. The cable drive assembly is continuously actuated until the container C is held tightly between the bulkhead 120 and the stationary shafts 300 and fork carrier 306. As pointed out above, the base 400 of the container C cooperates with the bulkhead 120 of the front module 12 and with the rear module 14 to form an actual part of the chassis of the transport system 10. Now, the container C is ready to be transported from one location to another location between a moving trailer and a residence or other building. As the container C is transported, it is appreciated that the bulkhead 120 remains flush with the adjacent end of the container C. It is also appreciated that the rear module 14 remains flush against the adjacent edge of base 400. By actuating button 232 disposed adjacent to handle 56, the operator can turn motor 60 on and off and can, accordingly, cause the transport device to be propelled either forwardly or rearwardly. Steering is achieved through the turning assembly 44. Note that the wheels 36 can be rotated through the turning assembly 44 while the main frame assembly 20 of the front unit 12 remains relatively stationary with respect to the container C being transported.

Once it is desired to remove the container C from the transport system 10, the above lifting and loading process is simply reversed. Briefly, the cable assembly 24 is actuated to positively unwind or release the cables to 218 and 220. Cable loops 218a and 220a are disconnected from cable pins 312 and 314. The front and rear modules 12 and 14 are then moved outwardly from the container C and accordingly separated therefrom.

Thereafter, the entire transport system 10 can be loaded in the moving trailer for convenient transport to the next site where the same is to be used. It is appreciated that the stationary shafts 200 can be adjusted inwardly and outwardly with respect to the rear fork carrier 206. This permits the transport system to be adaptable to various sized containers C and also, enables the rear module 14 to be contracted to a relatively small transverse length for easy transport and storage within the moving trailer.

Figure 12:
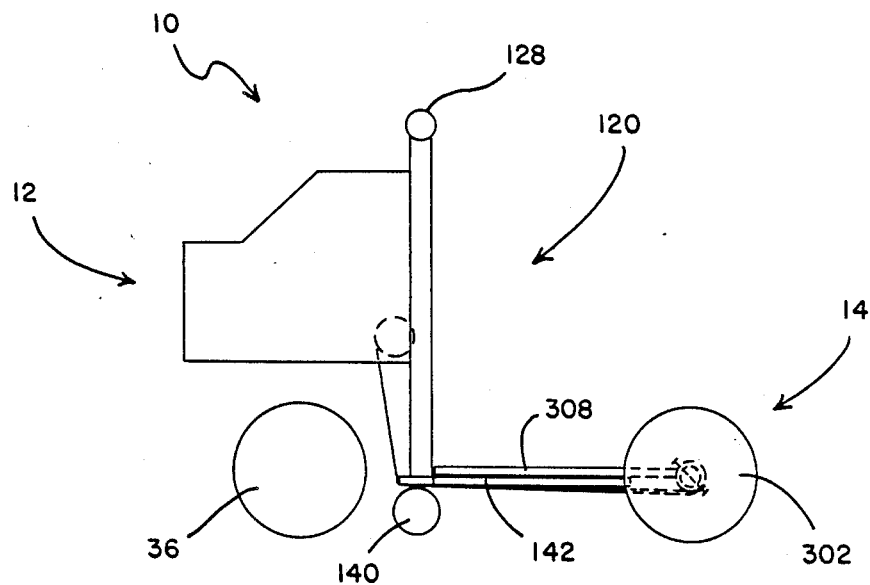
FIG. 12 is a schematic side elevational view illustrating the front and rear modules being pulled together to form a short bed or utility mode of operation.

As illustrated in FIG. 12, the front and rear modules 12 and 14 can be drawn together to where the front and rear forks overlap and form a relatively short bed. In this mode of operation, the transport system 10 of the present invention has utility other than carrying containers C. In this short bed mode, the cables 218 and 220 are maintained in a relatively taut position so as to securely hold and retain the rear module 14 in a tight and secure position with respect to the front module 12. This mode of operation gives the transport system 10 of the present invention additional utility. It is also appreciated that with the cable and cable drive assembly 24 and other features of the transport system 10, that a wide range of useful functions can be performed and carried out by the present transport system.

In the present disclosure, the main drive motor 60 is disclosed as a single speed motor. It is appreciated that a motor can be selected with dual speed.

From the foregoing specification and discussion, it is appreciated that the present invention entails a transport system that is highly portable and yet effective and efficient in transporting large storage containers between a moving trailer and a residence. Of particular importance is the fact that the entire transport system 10 can be controlled by one individual who in the process of transporting will walk along adjacent the front module 12 during which time he or she will steer the carrier and will control its forward and rearward movement.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A self propelled portable van to house a container carrier system for transporting a container having a base with opposite ends having fork openings therein, the container carrier system comprising: first and second separate wheel supported modules with the first module having a steerable wheel assembly and a main frame assembly supported on the steerable wheel assembly that permits relative rotation between the main frame assembly and the wheel assembly; a container bulk head formed on a rear of the first module for engaging and confining one end of a container to be transported; a pair of laterally spaced forks projecting rearwardly from a lower portion of the bulk head; the second module having a pair of rear forks projecting forwardly therefrom; a cable assembly mounted on one module and having two cables that extend underneath the forks of the first and second modules and interconnect the first and second modules; the cable assembly including means for tensioning the cables and pulling the first and second modules together which results in the forks lifting the container and sandwiching the container between the first and second modules and wherein the pair of laterally spaced forks and the pair of rear forks are designed to be of a length such that inward ends thereof terminate in spaced apart relationship underneath the container such that the container is supported by both pairs of forks and the cables and wherein the base of the container is held firmly between the bulk head and the second module in such a fashion that the base of the container actually forms a part of a carrier system chassis; a power source mounted on the main frame; a load carrying rotating plate rotatively mounted to the main frame; a plurality of circumferentially spaced bearing assemblies secured to the main frame and having the rotating plate rotatively mounted therein, each circumferentially spaced bearing assembly including a pair of vertically spaced rollers that sandwich and confine the rotating plate such that as the plate is rotated the plate is confined between the vertically spaced rollers, and a circumferential roller disposed outwardly of the rotating plate and generally engaged with the edge of the plate as the plate is rotated so as to generally horizontally confine the rotating plate; and wherein the wheel assembly includes a pair of wheels interconnected by an axle and wherein the rotating plate is connected to the wheel assembly such that as the wheels are turned the rotating plate rotates with respect to the main frame; drive means interconnecting the power source and the wheel assembly thereby making the carrier assembly self propelled; a walk along steering assembly operatively connected to the wheel assembly of the first module and projecting outwardly therefrom for enabling an operator to walk along adjacent the first module for steering the first module while the carrier is being powered by the power source; the steering assembly being directly connected to the rotating plate and extending upwardly therefrom and including a vertical central post that is disposed centrally over the rotating plate and which extends upwardly therefrom in coaxial relationship with the rotation plate, and a generally horizontal transverse arm secured to a top portion of the central post and extending generally horizontally therefrom.

2. The carrier system of claim 1 wherein the second module forms a rear module and comprises an axle assembly having the two rear forks secured thereto and extending therefrom at an angle generally normal to the axis of the axle assembly.

3. The carrier system of claim 1 wherein the pairs of forks include a cable slit formed on the underside thereof to receive and retain the cables.

4. The carrier system of claim 1 wherein the wheel assembly includes a differential gear drive and the power means comprises an electric motor operatively connected to the differential gear drive for driving the same.

5. The carrier system of claim 4 including battery means for powering said electric motor and the cable assembly.

6. The carrier system of claim 1 wherein the second module comprises the rear module and includes axially adjustable wheels that permit the wheels thereof to be adjusted inwardly for convenient transport.

7. The carrier system of claim 1 wherein the main frame assembly of the first module includes an open center frame structure and wherein the steering assembly projects upwardly through the open center frame structure of the main frame assembly.

8. The portable carrier system of claim 1 wherein the bulk head includes an upper transverse member that includes a pair of rotatable collars mounted on opposite end portions thereof for engaging edge portions of the container during the lifting and transporting of the container, whereby when the action of the carrier forces the container against the rotatable collars, the rotatable collars can absorb the impact thereby minimizing potential damage to the container.

9. The carrier system of claim 7 wherein the main frame assembly includes at least one battery shelf for supporting one or more batteries thereon.

10. The portable carrier system of claim 1 wherein said means for tensioning the cables includes a cable drive shaft having a pair of cable take up reels formed on opposite ends thereof; a gear box operatively connected to the cable drive shafts; and an electric motor operatively connected to the gear box for driving the cable drive shafts.

11. The portable carrier system of claim 1 including four bearing assemblies generally equally spaced that serve to connect the main frame assembly with the rotating plate.

12. The portable carrier system of claim 1 including a pair of stabilizing wheels secured rearwardly of the main wheels of the wheel assembly on the first module, the stabilizing wheels serving to stabilize the first module when the first module is separated from the second module and is disposed in a no load mode.

13. A portable battery powered container carrier for transporting a storage or moving container between a moving trailer and a building, comprising:
   a. a self propelled front module;

b. the self propelled front module including a main frame structure, a power source mounted on the main frame structure, a steerable wheel assembly for supporting the main frame and including wheel means and a turning and main frame assembly support plate supported by the wheel means, and drive means interconnecting the power source with the wheel assembly;

c. a plurality of circumferentially spaced bearing assemblies secured to the main frame and having the turning and main frame assembly support plate rotatively mounted therein, each bearing assembly including a pair of vertically spaced rollers that sandwich and confine the support plate such that the support plate is confined between the vertically spaced rollers, and a circumferential roller disposed outwardly of the vertically spaced rollers and engaged with an outer edge of the support plate so as to laterally confine the support plate within the bearing assemblies;

d. the front powered module further including a walk along, hand controlled, steering assembly mounted to the support plate and extending upwardly therefrom through the main frame assembly and including a generally horizontally disposed turning arm assembly extending outwardly therefrom for steering the front module, the steering assembly being connected directly to the support plate and extending upwardly therefrom and including a vertical central post that is disposed centrally over the support plate and extends upwardly therefrom in coaxial relationship with the support plate and wherein the turning arm assembly is connected to the vertical post and extends outwardly therefrom;

e. the front module including a pair of rearwardly projecting forks;

f. a cable drive assembly provided on the carrier and including a pair of cable reels and a cable secured and wound around each reel;

g. a rear module including an elongated axle-shaft assembly with wheels rotatively mounted on opposite ends thereof and a pair of rear forks secured to the axle-shaft assembly and projecting therefrom;

h. the front and rear forks being of a certain length with respect to a container width and adapted to be carried such that inner ends of the forks terminate in spaced apart relationship to each other when a container is supported thereby; and i. means for linking the cables between the front and rear modules such that a container can be lifted and supported therebetween in a sandwich fashion wherein the container is supported by both the front and rear forks and the cable assembly and wherein the base of the container forms a part of a carrier chassis structure.

* * * * *